United States Patent
Takagi et al.

(10) Patent No.: US 12,368,372 B2
(45) Date of Patent: Jul. 22, 2025

(54) POWER CONVERSION APPARATUS

(71) Applicants: Kabushiki Kaisha Toshiba, Tokyo (JP); Toshiba Infrastructure Systems & Solutions Corporation, Kanagawa (JP)

(72) Inventors: Takashi Takagi, Kawasaki Kanagawa (JP); Makoto Takeda, Tokyo (JP)

(73) Assignees: Kabushiki Kaisha Toshiba, Tokyo (JP); Toshiba Infrastructure Systems & Solutions Corporation, Kanagawa (JP)

( * ) Notice: Subject to any disclaimer, the term of this patent is extended or adjusted under 35 U.S.C. 154(b) by 281 days.

(21) Appl. No.: 18/063,935

(22) Filed: Dec. 9, 2022

(65) Prior Publication Data

US 2023/0246539 A1    Aug. 3, 2023

(30) Foreign Application Priority Data

Feb. 3, 2022    (JP) .................... 2022-015732

(51) Int. Cl.
*H02M 1/088* (2006.01)
*H02M 1/08* (2006.01)
*H02M 3/158* (2006.01)

(52) U.S. Cl.
CPC .......... *H02M 1/088* (2013.01); *H02M 1/081* (2013.01); *H02M 3/1584* (2013.01)

(58) Field of Classification Search
CPC ............................. H01H 47/00; H01H 47/001
USPC .................................................. 361/139, 206
See application file for complete search history.

(56) References Cited

U.S. PATENT DOCUMENTS

| | | | |
|---|---|---|---|
| 2013/0033914 A1* | 2/2013 | Yahata | H02M 7/48 363/132 |
| 2015/0012161 A1* | 1/2015 | Kanekawa | B62D 5/0487 180/443 |
| 2017/0288385 A1* | 10/2017 | Naka | H01L 27/0292 |
| 2022/0029572 A1* | 1/2022 | Aoyagi | H02P 27/08 |

(Continued)

FOREIGN PATENT DOCUMENTS

| JP | 2004-289938 A | 10/2004 |
|---|---|---|
| JP | 2017-208916 A | 11/2017 |

(Continued)

OTHER PUBLICATIONS

Office Action of corresponding Korean Patent Application No. 10-2022-0131254 issued on Apr. 23, 2024, 10 pages.

(Continued)

*Primary Examiner* — Yemane Mehari
(74) *Attorney, Agent, or Firm* — Knobbe, Martens, Olson & Bear, LLP (57) ABSTRACT

According to one embodiment, a power conversion apparatus includes: semiconductor elements mutually coupled in parallel; gate drivers which corresponds to the respective semiconductor elements and which supplies a drive voltage to the corresponding semiconductor elements; and a controller configured to supply to the respective gate drivers a gate command corresponding to the drive voltage in accordance with a carrier wave, wherein the semiconductor elements are set to a conductive state at different timings in an operation period of the semiconductor elements.

8 Claims, 6 Drawing Sheets

(56) References Cited

U.S. PATENT DOCUMENTS

2022/0190739 A1* 6/2022 Takagi ................ H02M 7/5387

FOREIGN PATENT DOCUMENTS

JP        2020-137263 A    8/2020
WO    WO 2020/161945 A1   8/2020

OTHER PUBLICATIONS

Fronczak et al., "Comparison of Optimization Algorithms for Boost Converter Controller Design", EE847—Department of Electrical and Microelectronic Engineering, Rochester Institute of Technology, Aug. 2013, 8 pages.

Jianing et al., "A novel stability analysis approach based on describing function method using for DC-DC converters", ResearchGate, Mar. 2015, pp. 2642-2647.

Kazimierczuk et al., "Feedforward Control of DC-DC PWM Boost Converter", IEEE Transactions on Circuits and Systems-I: Fundamental Theory and Applications, vol. 44, No. 2, Feb. 1997, pp. 143-148.

Final Office Action received in Korean Application No. 10-2022-0131254 dated Dec. 27, 2024, in 10 pages.

* cited by examiner

POWER CONVERSION APPARATUS

CROSS-REFERENCE TO RELATED APPLICATIONS

This application is based upon and claims the benefit of priority from Japanese Patent Application No. 2022-015732, filed Feb. 3, 2022, the entire contents of which are incorporated herein by reference.

FIELD

Embodiments described herein relate generally to a power conversion apparatus.

BACKGROUND

A power conversion apparatus is incorporated in devices and systems of various types for the realization of various usages. The conversion capacity of the power conversion apparatus has been increasing in accordance with market needs. In order to increase the conversion capacity, the current capacity in the semiconductor element of the apparatus, which plays a key role in power conversion, should be increased. This may be dealt with simply by adopting a semiconductor element with a high current rating in a semiconductor element of the power conversion apparatus. If the use of such a semiconductor element, however, is not sufficient to attain the targeted conversion capacity, the total current rating of the power conversion apparatus may need to be increased by adopting a plurality of semiconductor elements coupled in parallel, or a plurality of power conversion units coupled in parallel.

DETAILED DESCRIPTION

The power conversion apparatus according to the embodiments will be described with reference to FIGS. 1 to 6.

Hereinafter, the embodiments will be described in detail with reference to the drawings. In the description below, the same reference symbols will be assigned to elements having the same functions and structures.

If structural elements with reference symbols accompanied by numbers or letters (for circuits, wirings, voltages, signals, etc.) for differentiation do not need to be distinguished from one another, only the reference symbols may be referred to by omitting the accompanying numbers or letters.

In general, according to one embodiment, a power conversion apparatus includes: semiconductor elements mutually coupled in parallel; gate drivers which corresponds to the respective semiconductor elements and which supplies a drive voltage to the corresponding semiconductor elements; and a controller configured to supply to the respective gate drivers a gate command corresponding to the drive voltage in accordance with a carrier wave, wherein the semiconductor elements are set to a conductive state at different timings in an operation period of the semiconductor elements.

EMBODIMENTS

The power conversion apparatus according to the embodiments will be described with reference to FIGS. 1 to 6.

(1) First Embodiment

The configuration and operations of the power conversion apparatus according to the first embodiment will be explained with reference to FIGS. 1 and 2.

(a) Exemplary Configuration

Figure 1:
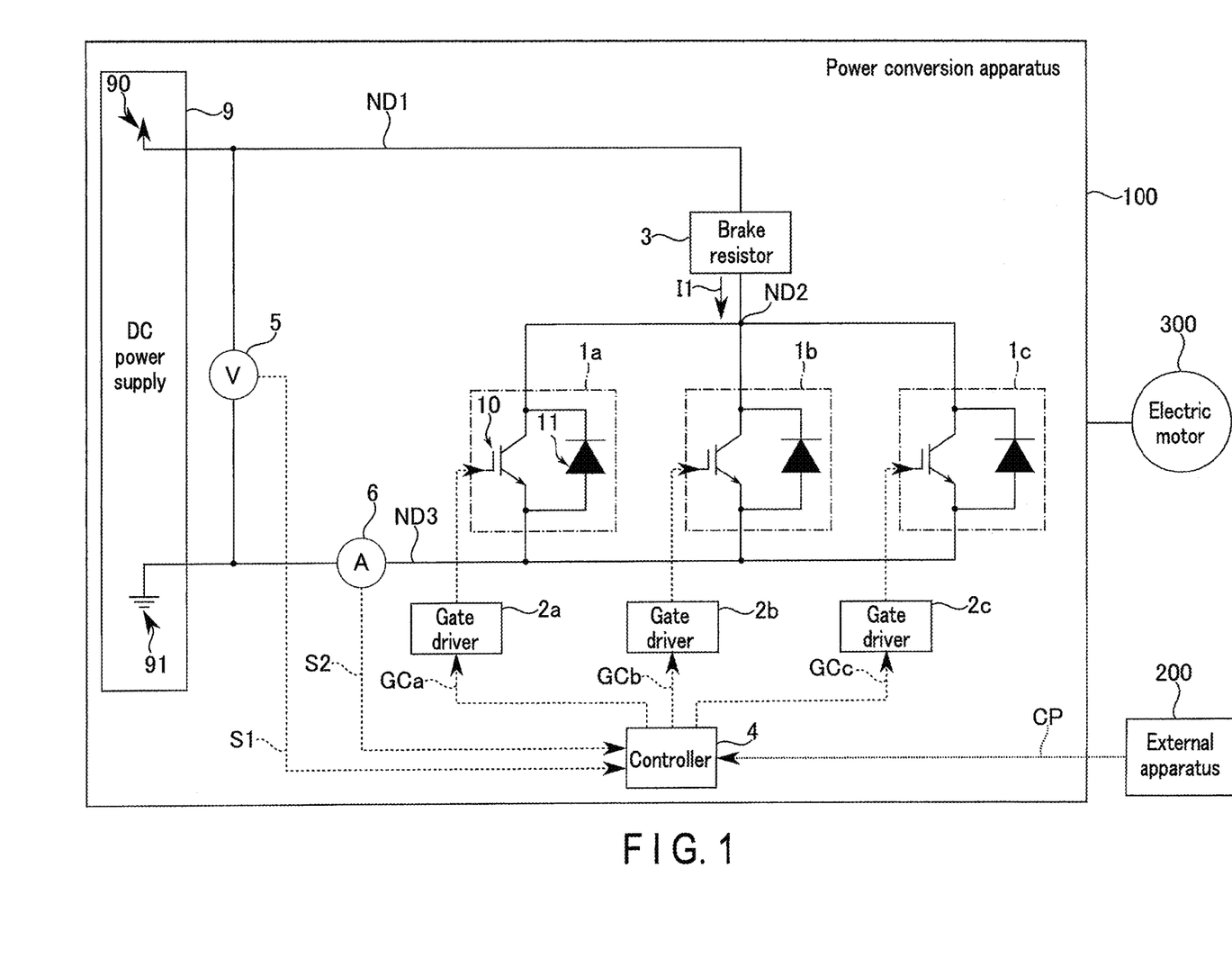
FIG. 1 is a circuit diagram showing an exemplary configuration of a power conversion apparatus according to the first embodiment.

FIG. 1 is a circuit diagram showing an exemplary configuration of the power conversion apparatus 100 according to the present embodiment.

As illustrated in FIG. 1, the power conversion apparatus 100 according to the present embodiment includes a plurality of semiconductor elements 1 (1a, 1b, and 1c), a plurality of gate drivers 2 (2a, 2b, and 2c), a brake resistor 3, a controller 4, a voltage detector 5, a current detector 6, and a direct-current (DC) power supply 9.

The semiconductor elements 1 and brake resistor 3 are coupled between a high potential-side wiring (which is also referred to as a "DC link") and low potential-side wiring of the DC power supply 9. The high potential-side wiring is electrically coupled to a positive terminal 90 of the DC power supply 9 via a connection node (which is also referred to as a "connection point", "connection terminal", or simply "node") ND1. The low potential-side wiring is electrically coupled to a negative terminal (ground or earth) 91 of the DC power supply 9 via a connection node ND3.

The three semiconductor elements 1 (1a, 1b, and 1c) are provided in the power conversion apparatus 100. Each of the semiconductor elements 1 includes a switching element 10 such as an insulated gate bipolar transistor (IGBT), a rectifying element 11 such as a diode, and the like. The semiconductor element 1 may also include a field effect transistor (not shown) such as a metal-oxide-semiconductor (MOS) transistor.

One of the two terminals of each semiconductor element 1 is coupled to the connection node ND2. While the other terminal of the two terminals of each semiconductor element 1 is coupled to the connection node ND3. The connection node ND3 is coupled to the ground 91.

The three semiconductor elements 1a, 1b, and 1c are coupled in parallel with each other between the connection node ND2 and connection node ND3, as a result of which three current-carrying paths are formed in parallel in the power conversion apparatus 100. The parallel-coupled semiconductor elements 1 have the same inter-terminal potentials between the connection nodes ND2 and ND3.

Each of the semiconductor elements 1, while in a conductive state, allows a certain amount of current corresponding to the characteristics of the semiconductor elements 1.

The gate drivers 2 (2a, 2b, and 2c) are coupled to the semiconductor elements 1, establishing a one-to-one relationship. That is, a gate driver 2 is coupled to one of the semiconductor elements 1. According to the present embodiment, three gate drivers 2 are provided in the power conversion apparatus 100. Each of the gate drivers 2 supplies a gate drive voltage (gate signal) to the corresponding semiconductor element 1 in response to a gate command GC, which will be described later.

The brake resistor 3 is coupled to the semiconductor elements 1 via the connection node ND2 between the connection node ND1 and connection node ND3. One of the two terminals of the brake resistor 3 is coupled to the positive terminal 90 of the DC power supply 9 via the connection node ND1. The other terminal of the two terminals of the brake resistor 3 is coupled to one terminal of each semiconductor element 1 via the connection node ND2. The brake resistor 3 includes a plurality of resistor elements (not shown). In addition to the resistor elements, the brake resistor 3 may also include capacitive elements (not shown) and inductive elements (not shown). The portion constituted by the brake resistor 3 and semiconductor elements 1 may be referred to as a power conversion circuit.

The brake resistor 3 serves as a load of the power conversion apparatus 100. The brake resistor 3 outputs a current I1. The amount of current I1 (conduction amount) may be controlled in accordance with the conductive state of the semiconductor elements 1. The current I1 that flows through the brake resistor 3 generates Joule heat at the brake resistor 3. For instance, the power conversion apparatus 100 consumes the supplied power due to the heat generated at the brake resistor 3. In this manner, the power conversion apparatus 100 performs thermoelectric conversion. The amount of the current I1 may be regulated in accordance with the rated values (e.g., rated currents) of the power conversion apparatus 100 or the like.

The controller 4 controls the operations of the semiconductor elements 1 through the gate drivers 2.

For instance, the controller 4 generates a pulse width modulation (PWM) carrier to control the current-carrying period (which may also be referred to as a "conduction period") of the semiconductor elements 1. The PWM carrier wave is a signal that includes multiple triangular waves (triangular pulses) that are periodically output. The current-carrying period of a semiconductor element 1 corresponds to the period in which the semiconductor element 1 is in the ON state.

The controller 4 generates gate commands GC (GCa, GCb, and GCc) to control the conductive state (ON state) and non-conductive state (OFF state) of each semiconductor element 1. The controller 4 outputs the generated gate command GC to the corresponding gate driver 2. For instance, in order to bring a semiconductor element 1 to a conductive state (ON state or current carrying state), the controller 4 sets the signal level of the corresponding gate command GC to the first level (e.g., H level). In order to bring a semiconductor element 1 to a non-conductive state (OFF state or no-current carrying state), the controller 4 sets the signal level of the corresponding gate command GC to the second level (e.g., L level), which differs from the first level.

In response to the supplied command power CP, the controller 4 controls, based on the comparison of the PWM carrier wave with the duty factor of the semiconductor element 1, the form of the pulse (e.g., pulse width) of a to-be-generated gate command GC. The duty factor is determined based on the controls, including PI control, upon the voltages and currents in the power conversion apparatus 100. The duty factor represents a ratio of a current-carrying period of the semiconductor element 1 to a cycle of the PWM carrier wave.

The controller 4 may include a control processor (not shown), a memory (not shown), a counter (not shown), and the like. The controller 4 may also include a calculation circuit configured to realize various functions by software programs or by combinations of software and hardware.

The controller 4 is configured to control the operation timings of the semiconductor elements 1 based on a sequence set up by software.

The voltage detector 5 is configured to detect a voltage equivalent to a potential difference between the connection node ND1 and connection node (ground) ND3. The voltage detector 5 is configured to measure and acquire the voltage value of the detected voltage. The voltage detector 5 sends a signal S1 indicating the voltage value of the detected voltage to the controller 4. The voltage detector 5 is coupled in parallel with the semiconductor elements 1 and brake resistor 3 between the connection node ND1 and connection node ND3.

The current detector 6 is configured to detect the current I1 output from the brake resistor 3. The current I1 may be supplied, for example, via the semiconductor elements 1 to the current detector 6. The current detector 6 is configured to measure and acquire the current value of the detected current I1. The current detector 6 sends a signal S2 indicating the current value of the detected current I1 to the controller 4.

The power conversion apparatus 100 may be electrically coupled to an external apparatus 200 such as a processor. The power conversion apparatus 100 according to the present embodiment is configured to communicate with the external apparatus 200. The power conversion apparatus 100 receives a signal relating to the command power CP from the external apparatus 200. The command power CP is a signal that indicates the power (e.g., consumption power) that is to be converted by the brake resistor 3.

For instance, the power conversion apparatus 100 is coupled to the electric motor 300. The electric motor 300 is connected to wheels (not shown). The electric motor 300 receives a power supply voltage (power) subjected to AC-DC conversion by a power conversion apparatus (not shown) such as a three-phase inverter circuit. In accordance with the supplied power supply voltage, the electric motor 300 generates a torque. The electric motor 300 applies the energy corresponding to this torque to the wheels. When the supply of the power supply voltage to the electric motor 300 is interrupted (e.g., at the time of deceleration or halting of the wheels), the electric motor 300 generates regenerative power in accordance with the rotations of the electric motor 300.

The power conversion apparatus 100 adjusts the DC voltage of the DC power supply 9, and supplies it to the brake resistor 3.

The power conversion apparatus 100 is configured to receive regenerative power from the electric motor 300. This regenerative power is supplied to the brake resistor 3. The power conversion apparatus 100 consumes the regenerative power generated by the electric motor 300, through the thermoelectric conversion performed by the brake resistor 3.

That is, the power conversion apparatus 100 illustrated in FIG. 1 corresponds to a dynamic braking circuit (braking chopper circuit) for controlling the power consumption of the brake resistor 3. In the power conversion apparatus 100, which serves as a dynamic braking circuit, a semiconductor element 1 may also be referred to as a braking chopper element.

The internal structure of the power conversion apparatus 100 is not limited to the above. Other structural components may be provided in the apparatus 100, or some of the above-mentioned structural components may be omitted from the apparatus 100. For instance, one or more of the voltage detector 5, current detector 6 and DC power supply 9 may be components of a structure external to the power conversion apparatus 100. Various signals including the gate command GC, gate signal, and command power CP may be electrical signals supplied through wiring, or optical signals supplied through a photocoupler.

In the power conversion apparatus 100 according to the present embodiment, the semiconductor elements 1 coupled in parallel with each other between the two connection nodes ND2 and ND3 are brought into a conductive state at different timings in a certain operation period. In other words, the current-carrying periods of the semiconductor elements 1 do not overlap each other in the power conversion apparatus 100 according to the present embodiment.

(b) Exemplary Operations

Figure 2:
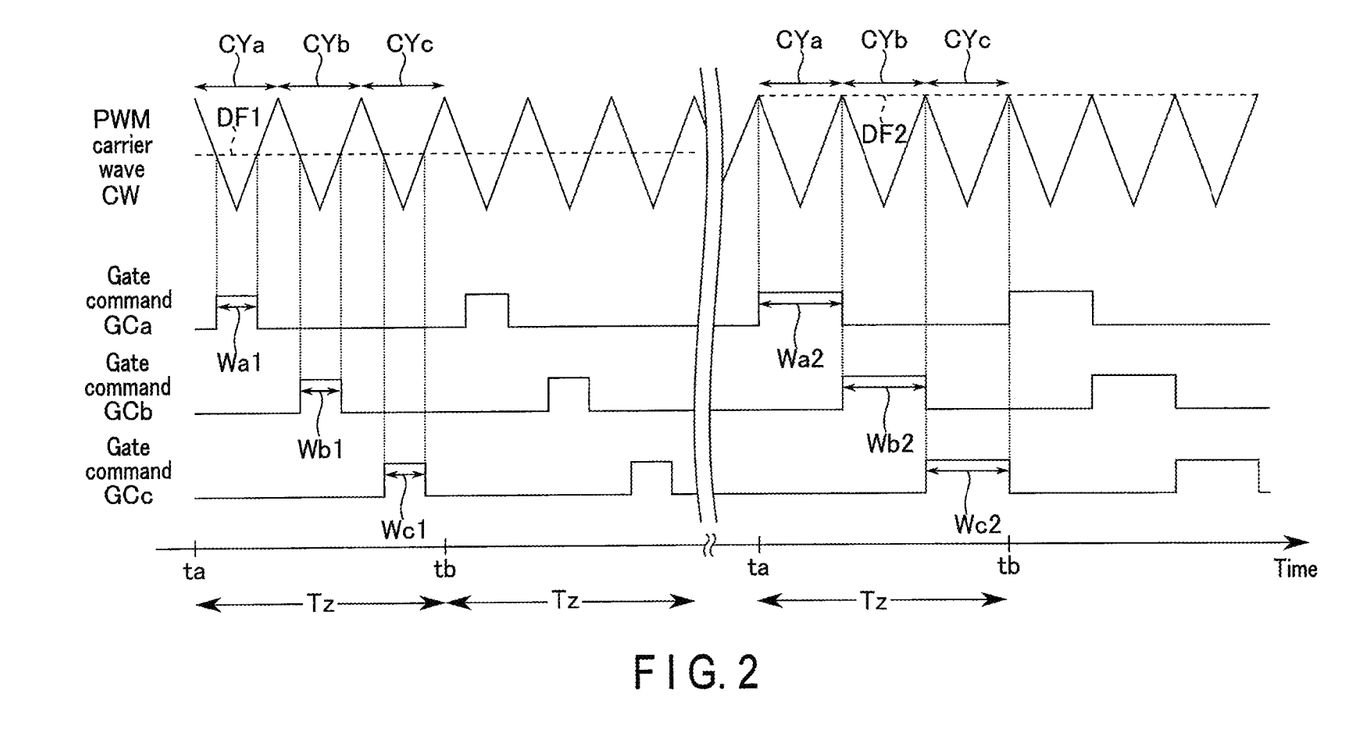
FIG. 2 is a waveform chart showing exemplary operations of the power conversion apparatus according to the first embodiment.

FIG. 2 is a waveform chart showing exemplary operations of the power conversion apparatus 100 according to the first embodiment.

The waveform chart of FIG. 2 shows switching timings of different semiconductor elements 1 of the power conversion apparatus 100.

The switching timing chart of the semiconductor element 1 in FIG. 2 depicts temporal shifts of a PWM carrier wave generated by the controller 4 of FIG. 1, and gate commands GC (GCa, GCb, and GCc) output from the controller 4 to the three parallel semiconductor elements 1a, 1b, and 1c.

The operation of the power conversion apparatus according to the present embodiment will be explained with reference to FIG. 2.

In the power conversion apparatus 100 of FIG. 1, the voltage between the connection nodes ND1 and ND3 is detected by the voltage detector 5, while the current (passing current) I1 output from the brake resistor 3 is detected by the current detector 6. The signal S1 relating to the voltage value of the detected voltage and the signal S2 relating to the current value of the current I1 are supplied to the controller 4.

The controller 4 multiplies the voltage value of this voltage (the value indicated by the signal S1) by the current value of the passing current I1 (the value indicated by the signal S2), to obtain the value of the power to be consumed by the power conversion apparatus (dynamic braking circuit) 100.

The controller 4 receives a command power CP from the external apparatus 200. For instance, the received command power CP indicates a value corresponding to a requested drive state (e.g., decelerating or stopped) of the electric motor 300.

As illustrated in FIG. 2, the controller 4 generates a PWM carrier wave CW to generate and control the gate command GC for each semiconductor element 1. For instance, the period Tz between time to and time tb represents one cycle (sequence) of the operation period Tz in which the conductive/non-conductive states of the parallel-coupled semiconductor elements 1 are sequentially controlled. The power conversion apparatus 100 repeatedly executes the operation periods Tz.

According to the present embodiment, the operation period Tz is divided into multiple portions (segments) in accordance with the number of semiconductor elements 1. If the number of semiconductor elements 1 coupled in parallel between the connection node ND2 and connection node ND3 is N, the period Tz is divided into N segments, where N is a natural number larger than or equal to 2. The lengths (Tz/N) of N segments obtained by dividing the operation period Tz are equal to each other. Each operation period Tz includes cycles CY corresponding to the triangular waves of the PWM carrier wave CW in accordance with the number of parallel-coupled current paths (for example, the number of parallel-coupled semiconductor elements 1).

According to the present embodiment, if there are three semiconductor elements 1 that are coupled in parallel, one operation period Tz includes three cycles of triangular waves. That is, the operation period Tz includes three segments corresponding to the periods, where one of the three semiconductor elements 1 becomes a target of control in one of the segments. The number of parallel-coupled semiconductor elements 1 may be 2, 4 or more.

The controller 4 determines the duty factor DF (DF1, DF2) of one or more semiconductor elements 1 through various controls (e.g., PI control) in such a manner as to bring the calculated power consumption to match the command power CP supplied to the controller 4. In accordance with the duty factor DF, the ratio of the current-carrying period (the period of the conductive state) of the semiconductor element 1 to a certain cycle CY of the PWM carrier wave CW is set. The period of time assigned to each semiconductor element 1, which corresponds to a cycle CY, may also be referred to as a control target period.

The controller 4 compares the PWM carrier wave CW with the duty factor DF1 in an operation period Tz. The controller 4 thereby generates a gate command GC having a desired pulse width (the length of the H level). The controller 4 supplies the generated gate command GC to the corresponding gate driver 2. The gate driver 2 supplies a gate drive voltage to the corresponding semiconductor element 1 in response to the signal at the H level of the supplied gate command GC. In the gate commands GCa, GCb, and GCc corresponding to the duty factor DF1, the signals at the H level respectively have pulse widths Wa1, Wb1, and Wc1.

As a result, a conduction in the corresponding one of the semiconductor elements 1 is allowed.

As illustrated in FIG. 2, the controller 4 switches, for each cycle CY of the generated PWM carrier wave CW having triangular waves, the semiconductor elements 1 so that one of the semiconductor elements 1 serves as a target for duty factor comparison.

For instance, within the operation period Tz including three cycles CYa, CYb, CYc of the PWM carrier wave CW, the semiconductor element 1a is a conductive state control target in the first cycle CYa, the semiconductor element 1b is a conductive state control target in the second cycle CYb, and the semiconductor element 1c is a conductive state control target in the third cycle CYc.

In the cycle CYa, the current I1 depends solely on the semiconductor element 1a in the conductive state, and therefore will not be substantially affected by the semiconductor element 1b or 1c in the non-conductive state. In the cycle CYb subsequent to the cycle CYa, the current I1 depends solely on the semiconductor element 1b in the conductive state, and will not be substantially affected by the semiconductor elements 1*a* or 1*c* in the non-conductive state. In the cycle CYc subsequent to the cycle CYb, the current I1 depends solely on the semiconductor element 1*c* in the conductive state, and will not be substantially affected by the semiconductor elements 1*a* or 1*b* in the non-conductive state.

As described above, according to the present embodiment, with three cycles of the PWM carrier wave CW regarded as one operation period Tz, the controller 4 repeats the switching of the conductive and non-conductive states for the three semiconductor elements 1.

In the power conversion apparatus 100 according to the present embodiment, in a cycle CY in which one of the semiconductor elements 1 is in the conductive state, none of the other semiconductor elements 1 will fall into the conductive state. Thus, in the power conversion apparatus 100 according to the present embodiment, only a single semiconductor element 1 is in the conductive state in a certain cycle CY.

If the semiconductor elements 1 have the same duty factor, the current-carrying periods (pulse widths of the gate command GC) Wa1, Wb1, and Wc1 of the parallel-coupled semiconductor elements 1 can be designed to have substantially the same length. In this manner, according to the present embodiment, the same amount of losses will be generated in the parallel-coupled semiconductor elements 1, and the required load will be evenly divided.

The duty factor of a semiconductor element 1 varies in accordance with the size of the command power CP. The pulse width of the gate command GC can be controlled in accordance with the variance of the duty factor. For instance, if the duty factor takes a small value in accordance with the command power CP, the pulse width of the gate command GC is reduced.

On the other hand, as in the duty factor DF2 of FIG. 2, if the duty factor takes a large value in accordance with the command power CP, the pulse widths Wa2, Wb2, and Wc2 of the gate commands GCa, GCb, and GCc are increased. In this case, the falling edge of a gate command (e.g., gate command GCa) may be substantially at the same timing as the leading edge of an adjacent gate command (e.g., gate command GCb).

In response to the leading edge and falling edge of a gate command GC, the semiconductor element 1 operates at a response speed that includes a certain amount of delay time. In other words, the semiconductor element 1 effectively operates after a certain delay time in response to the leading edge of a gate command GC. The semiconductor element 1 also terminates the operation after a certain delay time in response to the falling edge of the gate command GC.

Thus, even if the falling edge of a gate command GC appears at the same timing as the leading edge of the next gate command GC in accordance with the set duty factor DF2, the effective current-carrying periods of the two semiconductor elements 1 will not overlap each other. The semiconductor elements 1 therefore operate independently from each other in different cycles CY of each operation period Tz.

As described above, the segment in which each semiconductor element 1 is subjected to a load is one-third of the operation period Tz according to the present embodiment. Thus, when the current I1 flows through one semiconductor element 1 in a cycle CY, the load applied to this semiconductor element 1 will remain within the breakdown voltage range of the semiconductor element 1 based on the rated value of the power conversion apparatus 100.

(c) Summary

When increasing the current rating by connecting multiple semiconductor devices in parallel to increase the conversion capacity of the power conversion apparatus, it is preferable that agreement should be established in the dynamic characteristics between the semiconductor elements, in the characteristics between the gate drivers, and in the circuit impedances between the circuits. If such an agreement cannot be established, the passing current will not be evenly divided among the semiconductor elements operating simultaneously, which may adversely cause heat generation concentrating on a specific semiconductor element. This will increase the risk of breakdown in the power conversion apparatus.

In designing a power conversion apparatus as a product, it is necessary to leave leeway for the current capacity of the of semiconductor elements and/or for the number of parallel-coupled semiconductor elements in consideration of uneven division of a load on the semiconductor elements, and also from the aspect of derating. Alternatively, in order to match circuit impedances, the structural arrangement of the semiconductor elements and/or design of interconnecting conductors need to be optimized. Such needs often run counter to downsizing of an apparatus and footprint. This may deteriorate the product competitiveness of the power conversion apparatus.

In the circuit structure of the parallel-coupled semiconductor elements 1 according to the present embodiment, constraints to the hardware designing of the dynamic characteristics of the semiconductor elements 1, characteristics of the gate drivers 2, matching of circuit impedances, and the like, can be circumvented.

The power conversion apparatus 100 according to the present embodiment includes a parallel connection circuit, in which the current I1 is divided by a plurality of semiconductor elements 1 that are independently set to a conductive state. The power conversion apparatus 100 according to the present embodiment thereby evenly imposes a load on each semiconductor element 1 even under situations such as when it is difficult to arrange the semiconductor elements 1 close to each other in the hardware design.

As described above, the power conversion apparatus 100 according to the present embodiment evenly divides the period targeted for the control of the controller 4 (e.g., the current-carrying period) for the semiconductor elements 1*a*, 1*b*, and 1*c* coupled in parallel with each other in one current-carrying path. The power conversion apparatus 100 according to the present embodiment thereby sends a conduction command independently to each of the semiconductor elements 1*a*, 1*b*, and 1*c*.

According to the present embodiment, conduction occurs in only one semiconductor element 1 in each cycle CY of the period Tz, and therefore the passing current I1 can be uniquely determined without the need to consider differences in characteristics of the parallel-coupled semiconductor elements 1. In the power conversion apparatus 100 according to the present embodiment, all of the parallel-coupled semiconductor elements 1 have the same current-carrying periods and the same amounts of passing current I1, which results in the same amount of loss. Thus, the power conversion apparatus 100 according to the present embodiment can divide the load produced during the operation period Tz evenly for the semiconductor elements 1.

According to the present embodiment, constraints to the hardware design can be circumvented, realizing a simple software control of parallel-coupled semiconductor elements 1.

As a result, the power conversion apparatus according to the present embodiment can reduce constraints to the hardware design of the power conversion apparatus.

(2) Second Embodiment

A power conversion apparatus according to the second embodiment will be described with reference to FIGS. 3 and 4.

(a) Exemplary Configuration

Figure 3:
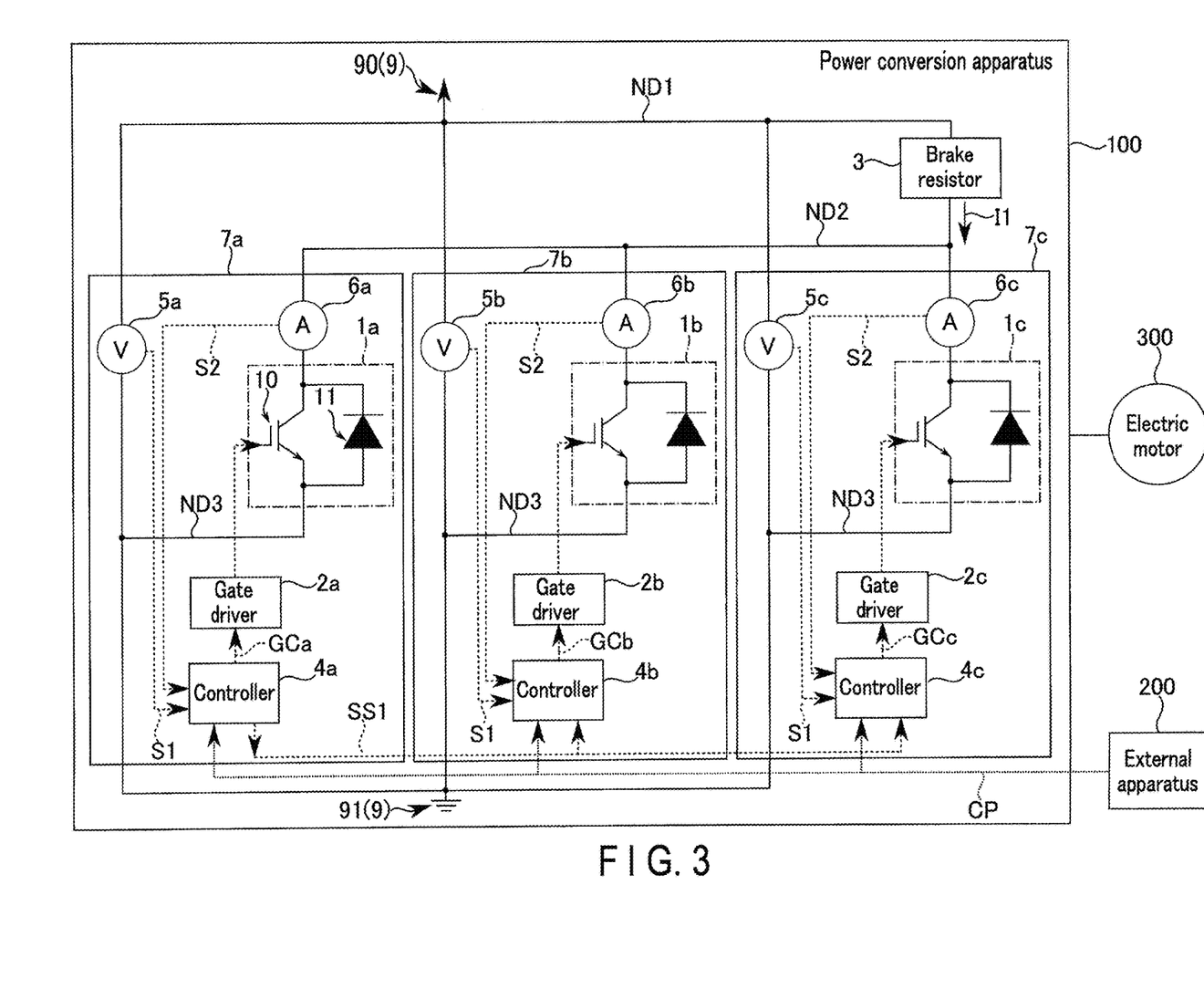
FIG. 3 is a circuit diagram showing an exemplary configuration of a power conversion apparatus according to the second embodiment.

FIG. 3 is a circuit diagram showing an exemplary configuration of the power conversion apparatus 100 according to the present embodiment.

The power conversion apparatus 100 illustrated in FIG. 3 includes a plurality of power conversion units 7 (7a, 7b, and 7c).

For instance, three power conversion units 7a, 7b, and 7c are provided in the power conversion apparatus 100.

The power conversion unit 7a includes a semiconductor element 1a, a gate driver 2a, a controller 4a, a voltage detector 5a, and a current detector 6a. The power conversion unit 7b includes a semiconductor element 1b, a gate driver 2b, a controller 4b, a voltage detector 5b, and a current detector 6b. The power conversion unit 7c includes a semiconductor element 1c, a gate driver 2c, a controller 4c, a voltage detector 5c, and a current detector 6c.

In each of the power conversion units 7, the current detector 6 is provided between the connection node ND2 and the semiconductor element 1. In the example of FIG. 3, the voltage detector 5 is coupled to the connection node ND3 without a current detector 6 interposed.

The three power conversion units 7a, 7b, and 7c are commonly coupled to the brake resistor 3.

In the same manner as in the previous embodiment, the power conversion apparatus 100 according to the present embodiment corresponds to a dynamic braking circuit for controlling the power consumption at the brake resistor 3.

In the power conversion apparatus 100 according to the present embodiment, the semiconductor elements 1 are provided independently in the respective power conversion units 7, and a controller 4 is provided for each of the semiconductor elements 1. Each of the power conversion units 7 may include a plurality of semiconductor elements 1 connected in parallel with each other.

In each power conversion unit 7, the controller 4 (4a, 4b, or 4c) controls the operation of the corresponding semiconductor element 1 (1a, 1b, or 1c) based on various kinds of information, including the detection results of the voltage detector 5 (5a, 5b, or 5c), the detection results of the current detector 6 (6a, 6b, or 6c), and the command power CP, and the like.

Each of the controllers 4 generates a PWM carrier wave CW (CWa, CWb, or CWc). The PWM carrier waves CWa, CWb, and CWc include triangular waves of a certain periodicity.

One of the controllers 4 generates a synchronization signal SS1, and sends the generated synchronization signal SS1 to other controllers 4. For instance, according to the present embodiment, the controller 4a generates the synchronization signal SS1. The controller 4a sends the generated synchronization signal SS1 to the controllers 4b and 4c. The controllers 4b and 4c receive the synchronization signal SS1.

The synchronization signal SS1 is a signal for controlling the operation timings across the power conversion units 7. The synchronization signal SS1 may be a quadrangular pulse signal with a leading edge and a falling edge. The carrier waves of the power conversion units 7 have their phases synchronized with the timing of the leading edge or falling edge of the synchronization signal SS1, and the phases of the carrier waves are thereby matched with one another.

(b) Operation

Figure 4:
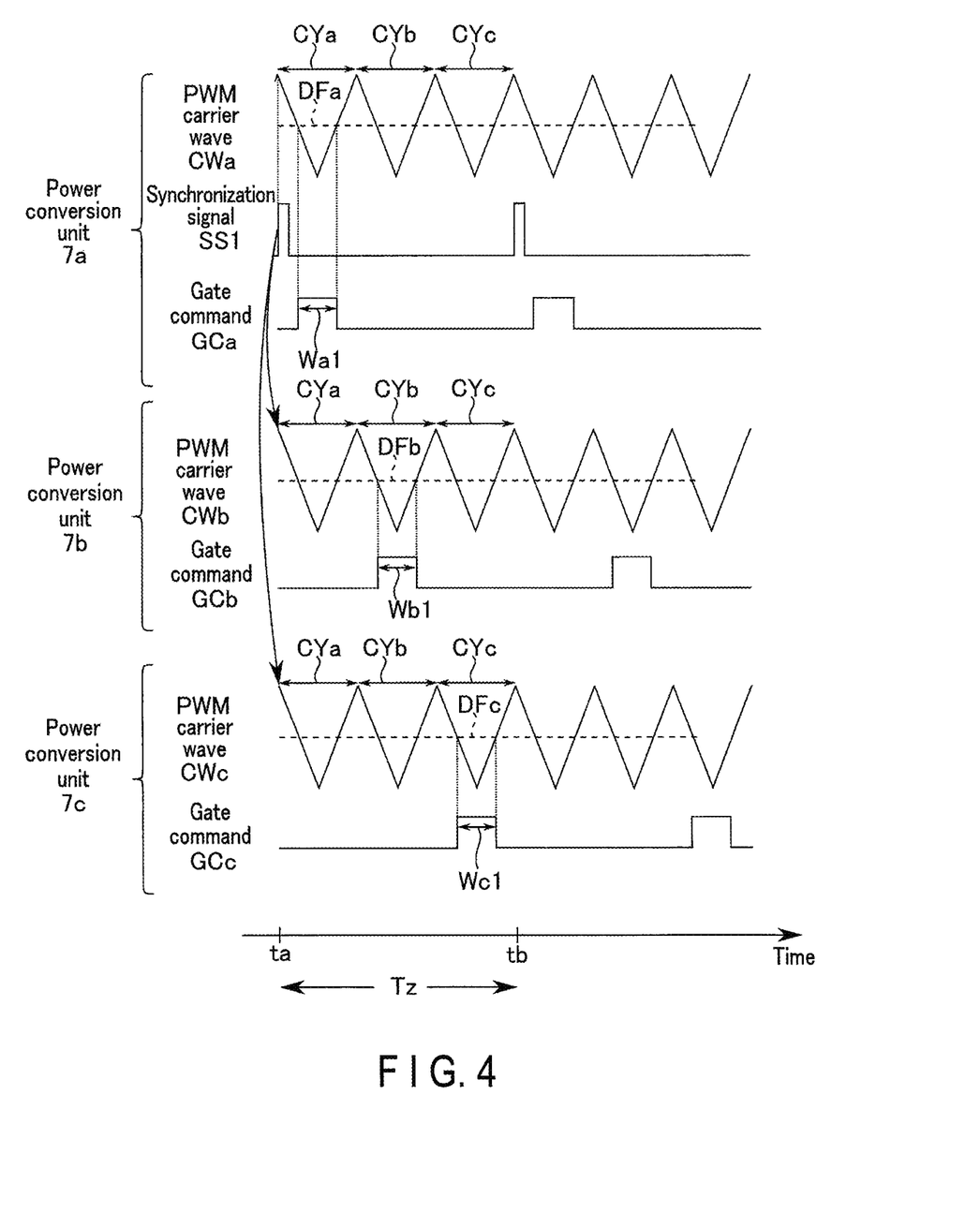
FIG. 4 is a waveform chart showing exemplary operations of the power conversion apparatus according to the second embodiment.

FIG. 4 is a waveform chart showing exemplary operations of the power conversion apparatus 100 according to the present embodiment.

The waveform chart of FIG. 4 indicates the switching timings of the semiconductor elements 1 in the power conversion units 7 of the power conversion apparatus 100.

In the chart of FIG. 4 showing the switching timings of the semiconductor elements 1, temporal shifts of the PWM carrier waves CWa, CWb, and CWc generated by the controllers 4a, 4b, and 4c, respectively, of FIG. 3, the gate commands GCa, GCb, and GCc output from the controllers 4a, 4b, and 4c to the semiconductor elements 1a, 1b, and 1c, respectively, and the synchronization signal SS1 are depicted.

In the power conversion apparatus 100 of FIG. 3, the power conversion unit 7a acquires the voltage value of the voltage between the nodes ND1 and ND3 with the voltage detector 5a, and the current value of the passing current I1 of the brake resistor 3 with the current detector 6a.

The controller 4a multiplies the acquired voltage value (value indicated by the signal S1) by the acquired current value (value indicated by the signal S2) to obtain the value of the power consumption of the power conversion apparatus 100. The controller 4a determines the duty factor DFa for the semiconductor element 1a using PI control or the like in such a manner that this power consumption value matches the command power CP supplied by the external apparatus 200 to the controller 4a. The controller 4a compares the PWM carrier wave CWa with the duty factor DFa to generate a gate command GCa for the semiconductor element 1a.

In a similar manner, in the power conversion unit 7b, the controller 4b calculates the power consumption value based on the voltage value obtained by the voltage detector 5b and the current value obtained by the current detector 6b. The controller 4b determines the duty factor DFb for the semiconductor element 1b based on the calculated power consumption value and the command power CP. The controller 4b compares the PWM carrier wave CWb with the duty factor DFb to generate a gate command GCb for the semiconductor element 1b.

Furthermore, in the power conversion unit 7c, the controller 4c calculates the power consumption value based on the voltage value obtained by the voltage detector 5c and the current value obtained by the current detector 6c. The controller 4c determines the duty factor DFc for the semiconductor element 1c based on the calculated power consumption value and the command power CP. The controller 4c compares the PWM carrier wave CWc with the duty factor DFc to generate a gate command GCc for the semiconductor element 1c.

In FIG. 4, with respect to the PWM carrier wave CWa generated by the controller 4a, the controller 4a presets the period targeted for conduction control (control target period) of the semiconductor element 1a, only in the cycle CYa within the operation period Tz. In other cycles CYb and CYc within the period Tz, the controller 4a does not regard the semiconductor element 1a as a control target, and therefore does not allow the semiconductor element 1a to become conductive.

In a similar manner, the controller 4b controls the conductive state of the semiconductor element 1b by determining only the cycle CYb of the PWM carrier wave CWb as the control target period of the semiconductor element 1b. The controller 4c controls the conductive state of the semiconductor element 1c by determining only the cycle CYc of the PWM carrier wave CWc as the control target period of the semiconductor element 1c.

According to the present embodiment, the controllers 4a, 4b, and 4c, which belong to different power conversion units 7a, 7b, and 7c, may have different control processors. In this case, the PWM carrier waves CWa, CWb, and CWc generated by the controllers 4a, 4b, and 4c, respectively, may not always be in phase.

According to the present embodiment, the controller 4a is assigned to a master device, while the controllers 4b and 4c are assigned to subordinate devices. The controller 4a of the power conversion unit 7a generates a pulse synchronization signal SS1, for example at the start of the cycle CYa of the PWM carrier wave CW. The controller 4a sends the generated synchronization signal SS1 to the controllers 4b and 4c of other power conversion units 7b and 7c. In accordance with the received synchronization signal SS1, the controllers 4b and 4c correct the phases of the corresponding PWM carrier waves CWb and CWc such that the first cycle CYa starts at the timing of the synchronization signal SS1. For instance, the PWM carrier waves CWa, CWb, and CWc may be controlled by the controllers 4a, 4b, and 4c so as to have their phases matched at the timing of the leading edge of the synchronization signal SS1.

The power conversion apparatus 100 according to the present embodiment can thereby match the phases of the PWM carrier waves CWa, CWb, and CWc at the timings synchronous with the synchronization signal SS1.

The phases of the PWM carrier waves CWa, CWb, and CWc may be matched at the timings of the falling edges of the synchronization signal SS1.

In the same manner as the first embodiment, the semiconductor elements 1 of the power conversion units 7 according to the present embodiment are set to a conductive state at different timings (different cycles CY). That is, within the cycle CYa of the operation period Tz, only the semiconductor element 1a is set to the conductive state in a period corresponding to the gate command GCa at the H level supplied from the controller 4a. Within the cycle CYb subsequent to the cycle CYa, only the semiconductor element 1b is set to the conductive state in a period corresponding to the gate command GCb at the H level supplied from the controller 4b. Furthermore, within the cycle CYc subsequent to the cycle CYb, only the semiconductor element 1c is set to the conductive state in a period corresponding to the gate command GCc at the H level supplied from the controller 4c.

As described above, in the power conversion apparatus 100 according to the present embodiment, if the controllers 4a, 4b, and 4c provided corresponding to the semiconductor elements 1a, 1b, and 1c, which are coupled in parallel in a current-carrying path (the path between the connection node ND1 and ground 91), are processors provided independently from each other, a common synchronization signal SS1 is supplied to the controllers 4a, 4b, and 4c so as to have the phases of the PWM carrier waves CW matched with one another. In this manner, the power conversion apparatus 100 according to the present embodiment can bring the switching timings of the semiconductor elements 1 controlled by different PWM carrier waves CW, in conjunction with one another.

As a result, in a similar manner to the first embodiment, all the parallel-coupled semiconductor elements 1 according to the present embodiment have the same length of the current-carrying period and the same passing current I1, and thereby produce the same amount of loss. The semiconductor elements 1 therefore can evenly divide the load produced in the power conversion apparatus 100.

The power conversion apparatus 100 according to the present embodiment realizes a simple software control of the parallel-coupled semiconductor elements 1 while circumventing the constraints to the hardware design such as the dynamic characteristics of the parallel-coupled semiconductor elements 1, characteristics of the gate drivers 2, and matching of the circuit impedances.

The power conversion apparatus 100 according to the present embodiment therefore can reduce the constraints to the hardware design of the power conversion apparatus.

(3) Modification Examples

The power conversion apparatus according to the modification examples of the present embodiment will be described with reference to FIGS. 5 and 6.

Figure 5:
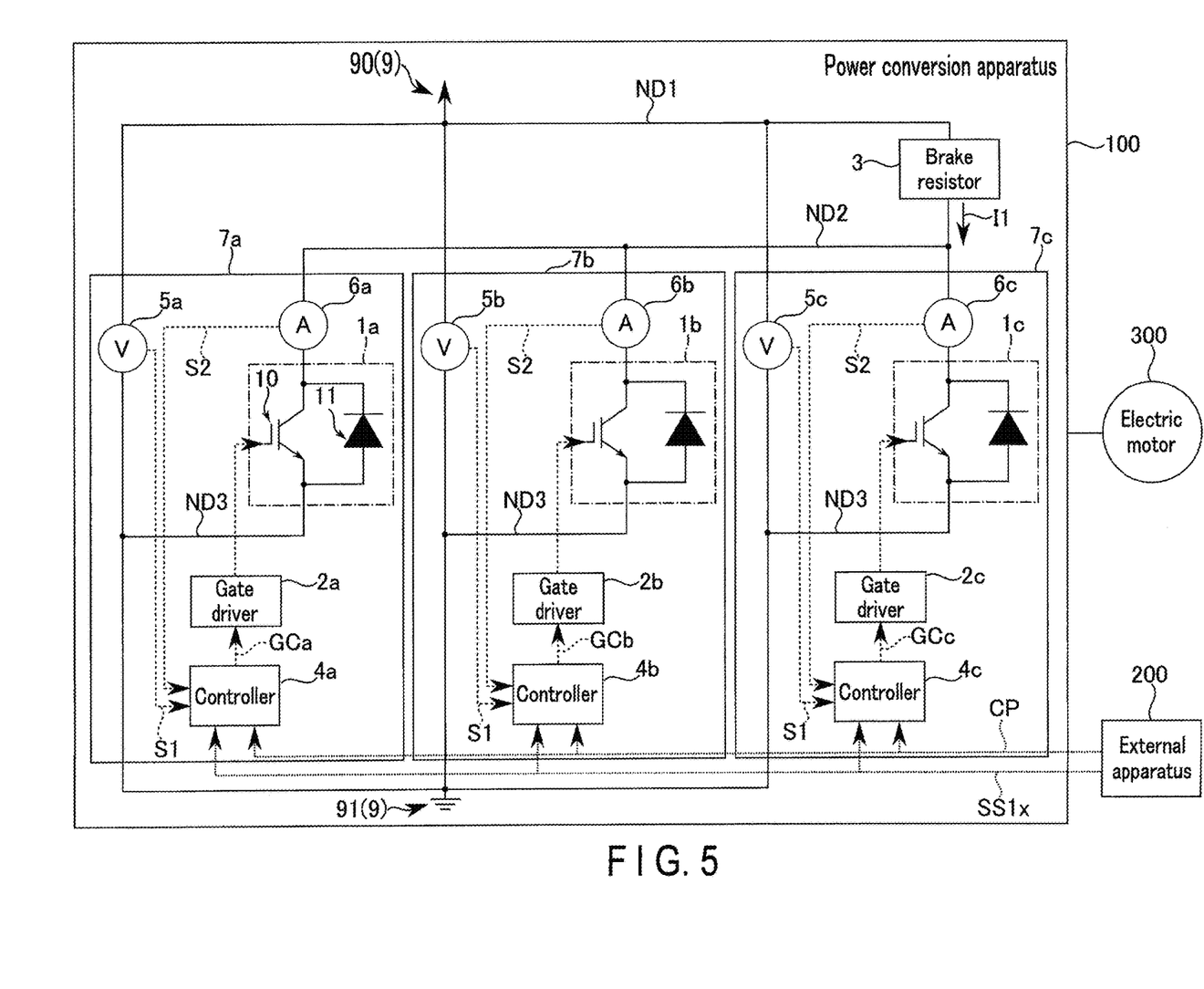
FIG. 5 is a circuit diagram showing a modification example of the power conversion apparatus according to the embodiments.

FIG. 5 is a circuit diagram showing a modification example of the power conversion apparatus according to the second embodiment.

As illustrated in FIG. 5, a synchronization signal SS1x is supplied from the external apparatus 200 to the power conversion apparatus 100. In the power conversion apparatus 100, a plurality of controllers 4 receive the synchronization signal SS1x from the external apparatus 200.

The controllers 4 correct the phases of the PWM carrier waves based on the synchronization signal SS1x in a similar manner to the example of FIGS. 3 and 4.

In this case also, the power conversion apparatus 100 according to the modification example in FIG. 5 realizes substantially the same operation as the one in the second embodiment.

Figure 6:
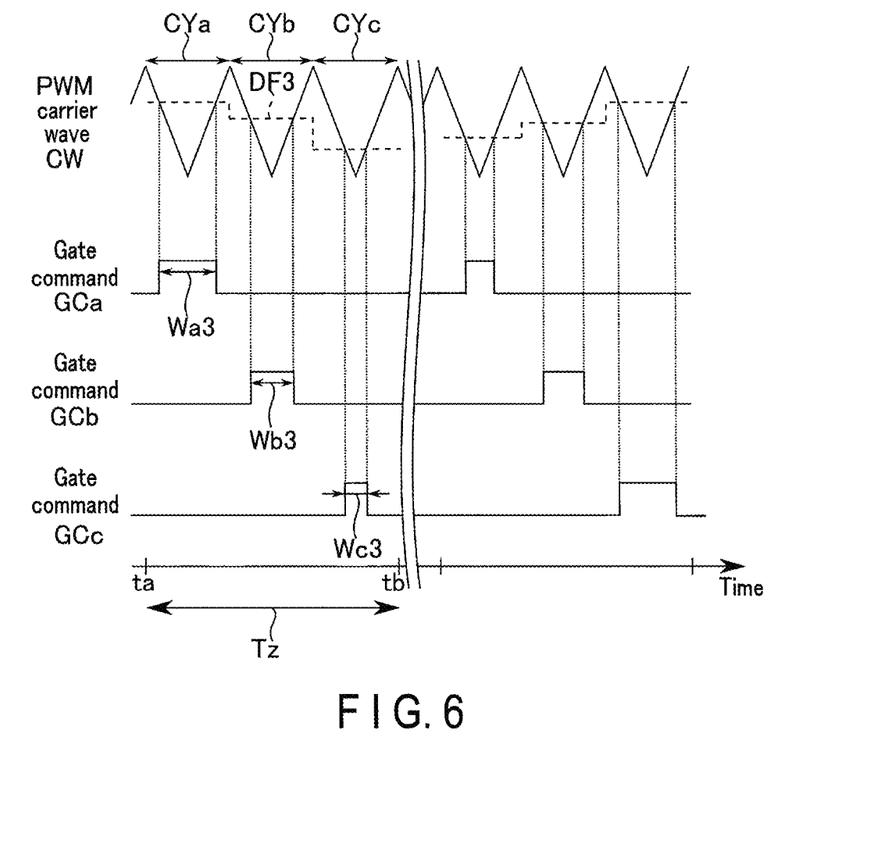
FIG. 6 is a waveform chart showing the modification example of the power conversion apparatus according to the embodiments.

FIG. 6 is a waveform chart showing the modification example of the operation of the power conversion apparatus 100.

As shown in FIG. 6, the value of the duty factor DF3 may vary in an operation period Tz. Here, the value of the comparison target duty factor DF3 varies in accordance with the different semiconductor elements 1. As a result, the pulse widths Wa3, Wb3, and Wc3 of the gate commands GCa, GCb, and GCc differ in accordance with the corresponding semiconductor elements 1a, 1b, and 1c.

For instance, the value of the duty factor DF3 in the cycle CYa is greater than the value of the duty factors DF3 in the cycles CYb and CYc. The value of the duty factor DF3 in the cycle CYb is smaller than the value of the duty factor DF3 in the cycle CYa and greater than the value of the duty factor DF3 in the cycle CYc. Here, the pulse width Wa3 in the cycle CYa is greater than the pulse widths Wb3 and Wc3 in the cycles CYb and CYc. The pulse width Wb3 in the cycle CYb is smaller than the pulse width Wa3 in the cycle CYa and greater than the pulse width Wc3 in the cycle CYc.

In FIG. 6, even with the gate commands GCa, GCb, and GCc having different pulse widths Wa3, Wb3, and Wc3 in the operation period Tz, the ON/OFF switching of the semiconductor elements 1 are controlled so that the semiconductor elements 1 are brought into a conductive state at different timings. According to this modification example, the current-carrying periods of the semiconductor elements 1 do not overlap each other in the operation period Tz.

Thus, the power conversion apparatus 100 according to the modification example of FIG. 6 can achieve substantially the same effects as in the power conversion apparatus 100 according to the previous embodiments.

(4) Others

The power conversion apparatus 100 according to the embodiments may be adopted, for example, in a train car, an automobile, a vessel, an aircraft, and a power generator. The power conversion apparatus 100 according to the embodiments may be provided in a system having other power conversion apparatuses such as an alternating-current inverter circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
a brake resistor receiving a regenerative power from a motor and outputting a current in accordance with the regenerative power;
semiconductor elements mutually coupled in parallel and serially coupled to the brake resistor, each of the semiconductor elements causing the current to flow through the brake resistor;
gate drivers configured to correspond to the respective semiconductor elements and supply a drive voltage to the corresponding semiconductor elements; and
a controller configured to supply to the respective gate drivers a gate command corresponding to the drive voltage in accordance with a carrier wave,
wherein the semiconductor elements are set to a conductive state at different timings in an operation period of the semiconductor elements, one semiconductor element set to the conductive state among the semiconductor elements causes the current to flow.

2. The power conversion apparatus according to claim 1, wherein
the operation period is divided into N segments, and each of the N divided segments of the operation period has a length expressed as T/N, where N (N is a natural number larger than or equal to 2) represents the number of semiconductor elements and T represents the operation period.

3. The power conversion apparatus according to claim 1, wherein
the semiconductor elements include a first semiconductor element, a second semiconductor element, and a third semiconductor element,
the carrier wave includes a first cycle, a second cycle, and a third cycle in the operation period,
in the first cycle, the first semiconductor element is set to the conductive state, while the second and third semiconductor elements are set to a non-conductive state,
in the second cycle, the second semiconductor element is set to the conductive state, while the first and third semiconductor elements are set to the non-conductive state, and
in the third cycle, the third semiconductor element is set to the conductive state, while the first and second semiconductor elements are set to the non-conductive state.

4. A power conversion apparatus comprising:
a brake resistor receiving a regenerative power from a motor and outputting a current in accordance with the regenerative power;
power conversion units mutually coupled in parallel and serially coupled to the brake resistor, each of the power conversion units causing the current to flow through the brake resistor,
wherein each of the power conversion units includes:
a semiconductor element causing the current to flow through the brake resistor;
a gate driver configured to supply a drive voltage to the semiconductor element; and
a controller configured to supply to the gate driver a gate command corresponding to the drive voltage in accordance with a carrier wave, and
the semiconductor elements of the power conversion units are set to a conductive state at different timings in an operation period of the semiconductor elements, the semiconductor element of one power conversion unit set to the conductive state among the power conversion units causes the current to flow.

5. The power conversion apparatus according to claim 4, wherein
the operation period is divided into N segments, and each of the divided segments of the operation period has a length expressed as T/N, where N (N is a natural number larger than or equal to 2) represents the number of power conversion units and T represents the operation period.

6. The power conversion apparatus according to claim 4, wherein
the controller of one power conversion unit of the power conversion units generates a synchronization signal,
the synchronization signal is supplied to the controllers of other power conversion units of the power conversion units, and
the controller of each of the other power conversion units aligns a phase of a carrier wave of each of the other power conversion units with a phase of a carrier wave of the controller of the one power conversion unit in accordance with the synchronization signal.

7. The power conversion apparatus according to claim 6, wherein
the synchronization signal is a pulse wave having a leading edge and a falling edge, and
the phase of the carrier wave of each of the power conversion units is synchronized with either one of the leading edge or the falling edge.

8. The power conversion apparatus according to claim 4, wherein
the power conversion units include a first power conversion unit, a second power conversion unit, and a third power conversion unit, in a first segment of the operation period, the semiconductor element of the first power conversion unit is set to the conductive state, while the semiconductor element of the second power conversion unit and the semiconductor element of the third power conversion unit are set to a non-conductive state, in a second segment of the operation period, the semiconductor element of the second power conversion unit is set to the conductive state, while the semiconductor element of the first power conversion unit and the semiconductor element of the third power conversion unit are set to the non-conductive state, and in a third segment of the operation period, the semiconductor element of the third power conversion unit is set to the conductive state, while the semiconductor element of the first power conversion unit and the semiconductor element of the second power conversion unit are set to the non-conductive state.

\* \* \* \* \*